United States Patent

Stadtfeld et al.

[11] Patent Number: 6,120,217
[45] Date of Patent: Sep. 19, 2000

[54] CUTTING TOOL FOR PRODUCING TOOTHED ARTICLES

[75] Inventors: Hermann J. Stadtfeld, Rochester; Raymond E. Clark, Mt. Morris, both of N.Y.

[73] Assignee: The Gleason Works, Rochester, N.Y.

[21] Appl. No.: 09/248,363

[22] Filed: Feb. 10, 1999

Related U.S. Application Data

[60] Provisional application No. 60/074,284, Feb. 11, 1998.

[51] Int. Cl.[7] ........................................................ B26D 1/12
[52] U.S. Cl. .............................. 407/21; 407/43; 407/49; 407/58; 407/115
[58] Field of Search ................................. 407/20, 21, 27, 407/28, 29, 40, 41, 43, 47, 49, 58, 115, 116

[56] References Cited

U.S. PATENT DOCUMENTS

| 1,073,873 | 9/1913 | Smith | 407/49 X |
|---|---|---|---|
| 2,173,848 | 9/1939 | Kraus | 407/49 X |
| 3,760,476 | 9/1973 | Kotthaus . | |
| 4,093,391 | 6/1978 | Bachmann et al. . | |
| 4,197,038 | 4/1980 | Hipp et al. . | |
| 4,278,370 | 7/1981 | Spear | 407/115 |
| 4,575,285 | 3/1986 | Blakesley | 407/115 |
| 4,621,954 | 11/1986 | Kitchen et al. . | |
| 4,932,813 | 6/1990 | Qvart | 407/49 X |
| 5,183,089 | 2/1993 | Norlander et al. | 407/49 X |

FOREIGN PATENT DOCUMENTS

9739851 10/1997 WIPO .

*Primary Examiner*—Henry W. H. Tsai
*Attorney, Agent, or Firm*—Robert L. McDowell

[57] ABSTRACT

A cutting tool comprising a cutter body member having a generally circular shape, a front surface, a back surface and an axis of rotation, the cutter body member includes an outer portion comprising a plurality of individual projections arranged spaced from one another about the cutter body with the space between successive projections defining receiving slots for cutting blades. The individual projections each further comprise an outer surface with at least one of the outer surfaces including a protrusion. Each of the blade receiving slots comprises opposing first and second side surfaces and an inner end portion with the inner end portion having a pair of angled mounting surfaces, one of the mounting surfaces extends from the first side surface and the other mounting surface extends from the second side surface with the angled mounting surfaces extending toward one another. Each of the angled mounting surfaces is oriented at an angle of less than 90 degrees with respect to its respective side surface. Preferably, one of the mounting surfaces is oriented at an angle of about 60 degrees while the other mounting surface is oriented at an angle of about 30 degrees.

16 Claims, 12 Drawing Sheets

CUTTING TOOL FOR PRODUCING TOOTHED ARTICLES

CROSS REFERENCE TO RELATED APPLICATIONS

This application claims the benefit of U.S. Provisional Application No. 60/074,284 filed Feb. 11, 1998.

Commonly assigned copending application Ser. No. 08/823,098 filed Mar. 24, 1997 now U.S. Pat. No. 5,890,846.

FIELD OF THE INVENTION

The present invention is generally directed to cutting tools for toothed articles such as gears and the like. Particularly, the present invention is directed to a cutter head and cutting blades for improving the machining accuracy of the cutting tool.

BACKGROUND OF THE INVENTION

It is known in the art to produce toothed articles, such as bevel and hypoid gears, with cutting tools comprising a head portion in which a plurality of cutting blades are positioned, for example, stick-type cutting blades manufactured from bar stock such as shown in U.S. Pat. No. 4,575,285 to Blakesley.

In the type of cutting tool mentioned above, it is customary to provide a circular cutter body having a plurality of slots extending inwardly a predetermined distance from the periphery of the cutter body for receiving and positioning cutting blades in the cutter body. In many instances, extending about the periphery of the cutter body is a clamping ring (or locking ring) which is secured to the cutter body and in which is mounted means to clamp one or more cutting blades in each of the positioning slots. Cutting tools including a clamping ring and blade clamping means can be seen, for example, in U.S. Pat. Nos. 4,621,954 to Kitchen et al.; 3,760,476 to Kotthaus; 4,093,391 to Bachmann et al.; or 4,197,038 to Hipp et al.

Traditionally, the positioning slots in a cutter head have been in a generally rectangular form of opposing side walls and an inner end wall which is perpendicular to the side walls. In machining these slots into the cutter head, it is understood that some clearance must be included in the slot dimensions in order for a cutting blade to be positioned in the slot. As such, even with the most accurate machining methods, there is always some amount of clearance between a cutting blade and a side wall surface when a cutting blade is clamped in position in a receiving slot.

With the square-cornered form of the prior art receiving slots and the clearance which exists between the cutting blade and a side wall surface of the slots, cutting blades have shown a tendency to twist in the receiving slots when subjected to the forces of some cutting operations thereby resulting in the formation of undesirable tooth geometries.

One arrangement for alleviating the problem of blade twist is addressed in international publication no. WO 97/39851 to Clark et al. The blade receiving slots comprise opposing side surfaces and an end portion comprising blade mounting surfaces which are angled toward one another with each mounting surface preferably extending at an angle of about 45 degrees with respect to its associated side surface. With this arrangement, a cutting blade with complementary shaped sides can positively seat against these angled mounting surfaces when clamped thus eliminating unwanted blade clearances as well as twisting of the blades during cutting.

The above-mentioned WO 97/39851 further discloses a cutter head comprising a plurality of double-dovetail shaped projections located on the outer portion of the cutter head body member. The double-dovetail projections are positioned in a complementary-shaped channel of a two-part cutter ring. The parts of the cutter ring are positioned above and below the projection and then drawn together by several screws thus securing the clamping ring to the cutter head body. By attaching the clamping ring in this manner, no heating of the cutter head is necessary and thus any heat-related distortions attributable to welding and/or heat shrinking are eliminated.

However, while avoiding heat-related distortions, formation of the double-dovetail projection requires significant machining accuracy which is quite time consuming. Tightening of the screws which join the two parts of the cutter ring may cause unwanted tension in the dovetail portion resulting in the formation of cracks between the projections of the cutter head during cutting operations or the dovetail portion may break off from the cutter head body member. Subsequent tightening blade clamping bolts adds more tension to the dovetail portion thereby further enhancing the possibilities of cracking and/or breakage.

It is an object of the present invention to provide a cutter head in which a cutter ring is attached to the cutter head body member in a manner which avoids the above-mentioned undesirable consequences.

It is a further object of the present invention to provide a cutter head in which the cutting blade mounting surfaces are arranged such that the strength of the cutter head is improved.

It is yet another object of the present invention to provide a blade clamping arrangement which allows the blade clamp to remain in the cutter head slot even in the absence of a cutting blade as well as in a position in the cutter head slot such that it does not impede insertion of a cutting blade into the slot.

SUMMARY OF THE INVENTION

The present invention is directed to a cutting tool comprising a cutter body member having a generally circular shape, a front surface, a back surface and an axis of rotation, the cutter body member includes an outer portion comprising a plurality of individual projections arranged spaced from one another about the cutter body with the space between successive projections defining receiving slots for cutting blades. The individual projections each further comprise an outer surface with at least one of the outer surfaces including a protrusion.

Each of the blade receiving slots comprises opposing first and second side surfaces and an inner end portion with the inner end portion having a pair of angled mounting surfaces, one of the mounting surfaces extends from the first side surface and the other mounting surface extends from the second side surface with the angled mounting surfaces extending toward one another. Each of the angled mounting surfaces is oriented at an angle of less than 90 degrees with respect to its respective side surface.

Positioned around the cutter body member is a clamping ring which includes at least one respective slot for receiving the protrusion on the cutter body member projection. The clamping ring includes an inner channel which provides clearance such that clamping means can be withdrawn partially thereinto thus creating sufficient room in the blade receiving slot to remove and/or insert cutting blades.

DETAILED DESCRIPTION OF THE INVENTION

The present invention will be discussed in detail with reference to the accompanying drawings.

The cutting tool of the present invention comprises a cutter body member, and a clamping ring which together comprise a cutter head. In addition to the cutter head, the cutting tool further includes cutting blades and clamping means to secure the cutting blades in position in the cutter head.

The cutter body member 2, as shown in FIGS. 1–4, is rotatable about an axis T and comprises a front surface 4 and a back surface 6 which may include a keyway 8 into which a key on a machine tool spindle is inserted when the cutting tool is mounted on the machine tool. The outer portion of the cutter body member 2 includes a plurality of individual projections 10 between which is defined cutting blade receiving slots 12 which are oriented at a desired hook angle as is known in the art. Each of the projections 10 has an outer surface 14 and least one, and preferably all, of the projections outer surfaces 14 includes a protrusion 16 of a form, usually rectangular, which generally corresponds to respective receiving slots in the clamping ring as will be described in detail below.

Figure 1:
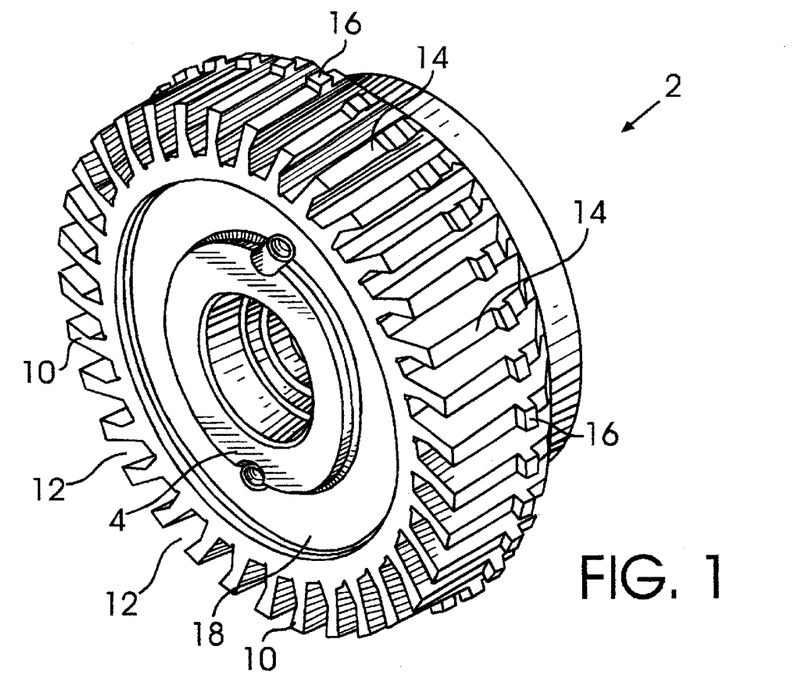
FIG. 1 shows a front perspective view of the cutter body member of the cutting tool of the present invention.
Figure 2:
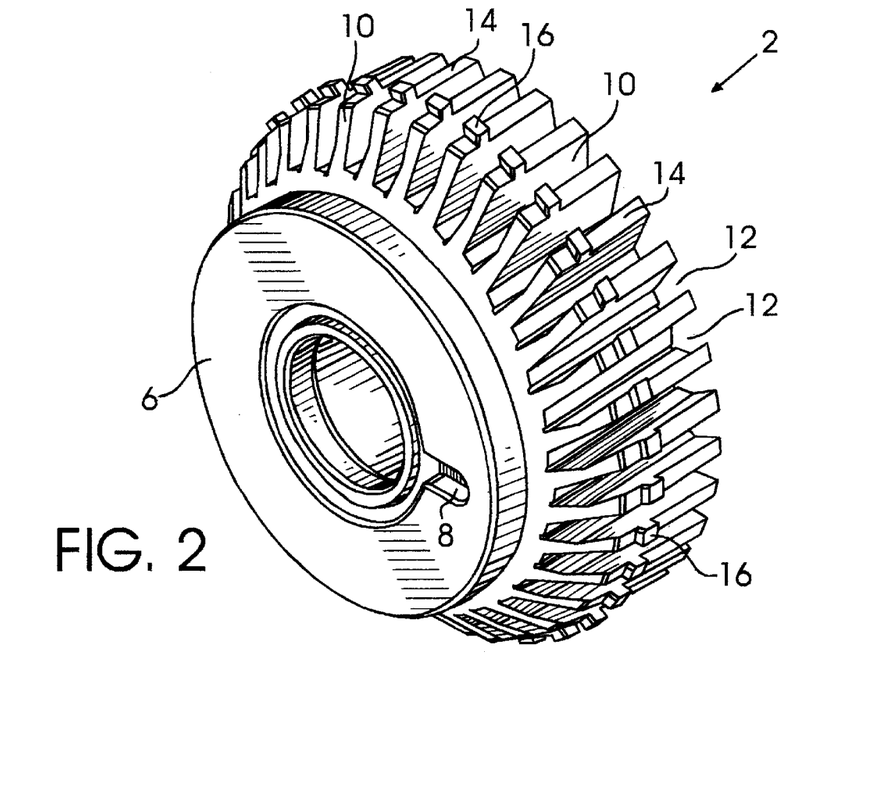
FIG. 2 shows a rear perspective view of the cutter body member of the cutting tool of the present invention.
Figure 3:
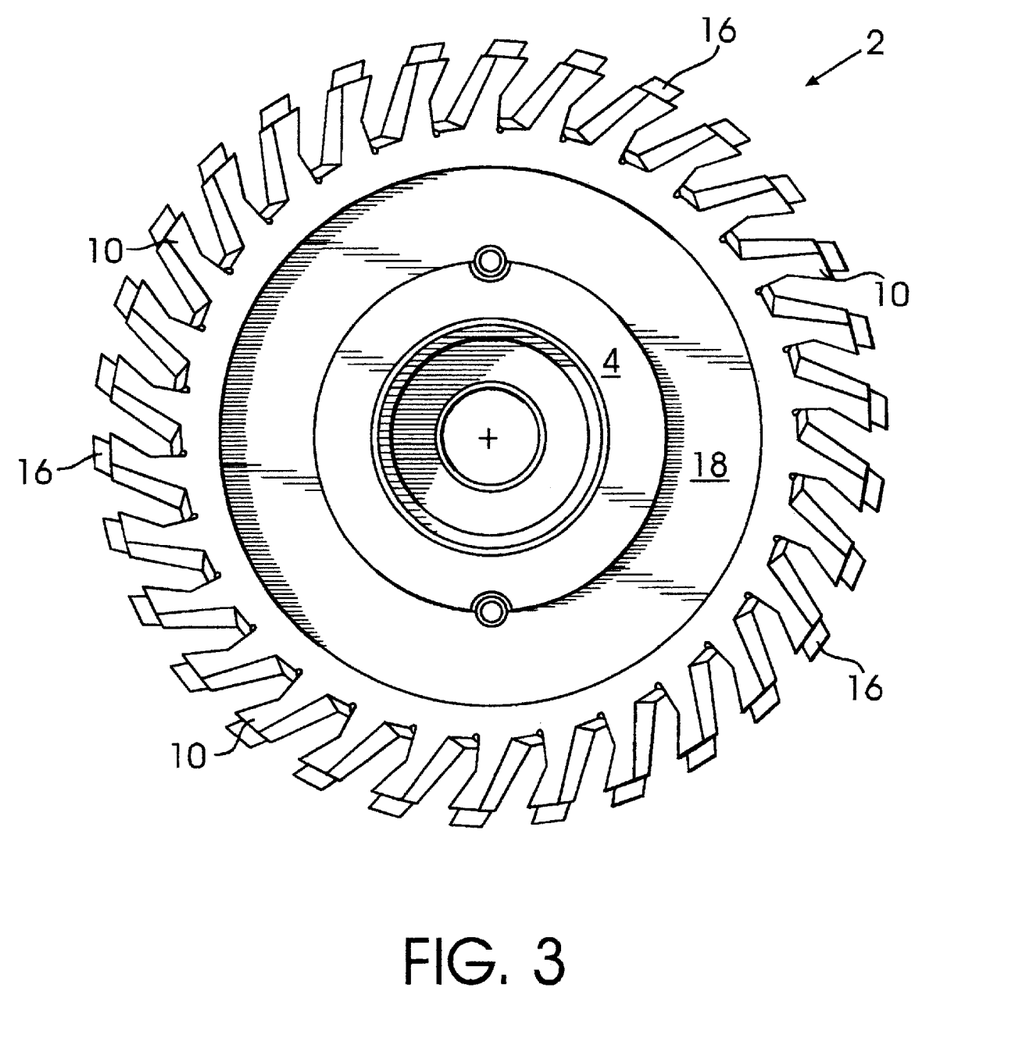
FIG. 3 illustrates a top view of the cutter body member of the inventive cutting tool.
Figure 4:
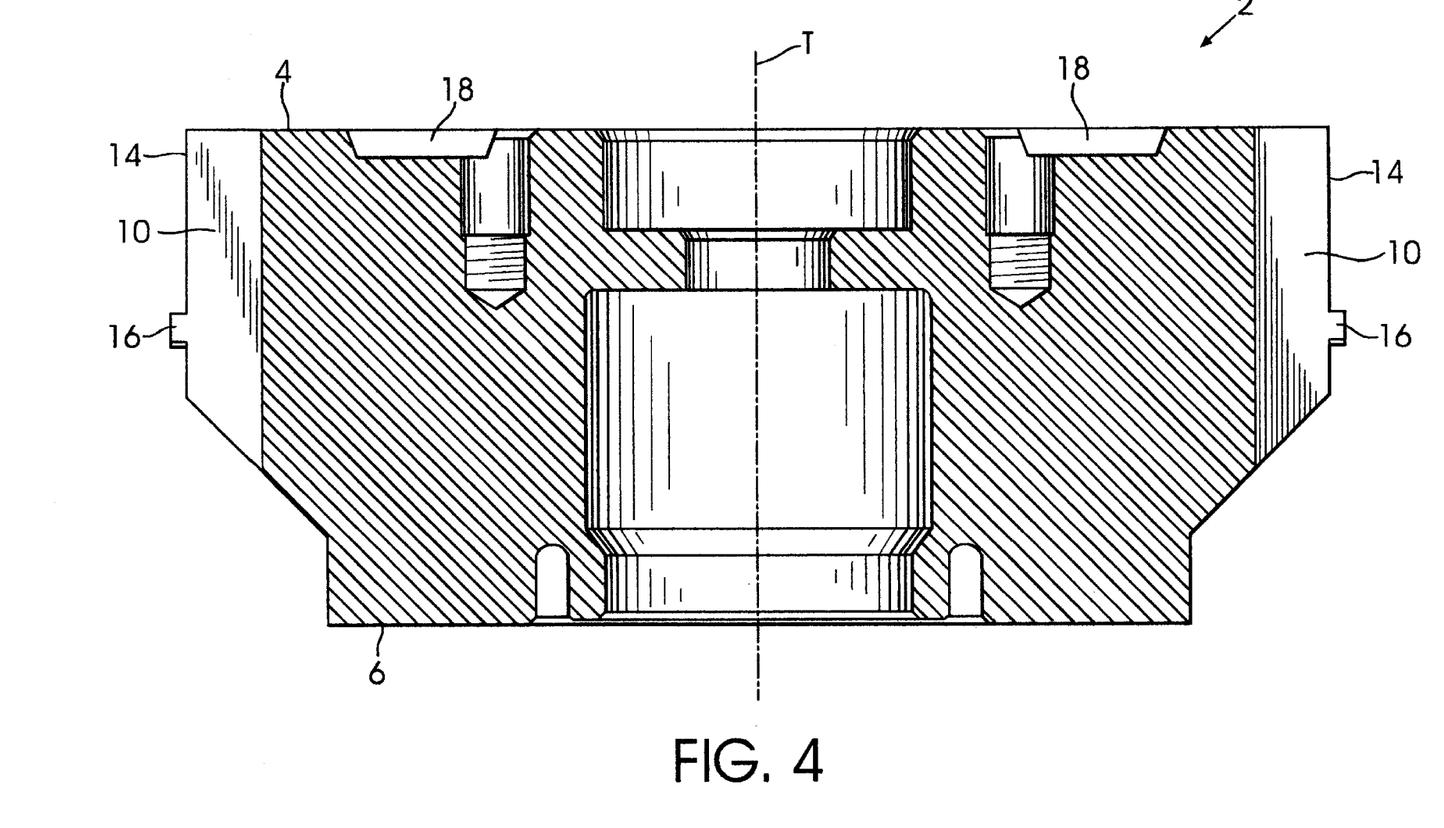
FIG. 4 illustrates a cross-sectional view of the cutter body member.

The front surface 4 of the cutter head may further include an annular depression 18 located concentric about the axis T.

In some cutting processes, such as cutting of pinions, interference can occur between the workpiece and the face of the cutting tool. By including the annular depression 18, sufficient clearance is created to allow the tool and workpiece to be properly positioned for cutting without interference.

Figure 5:
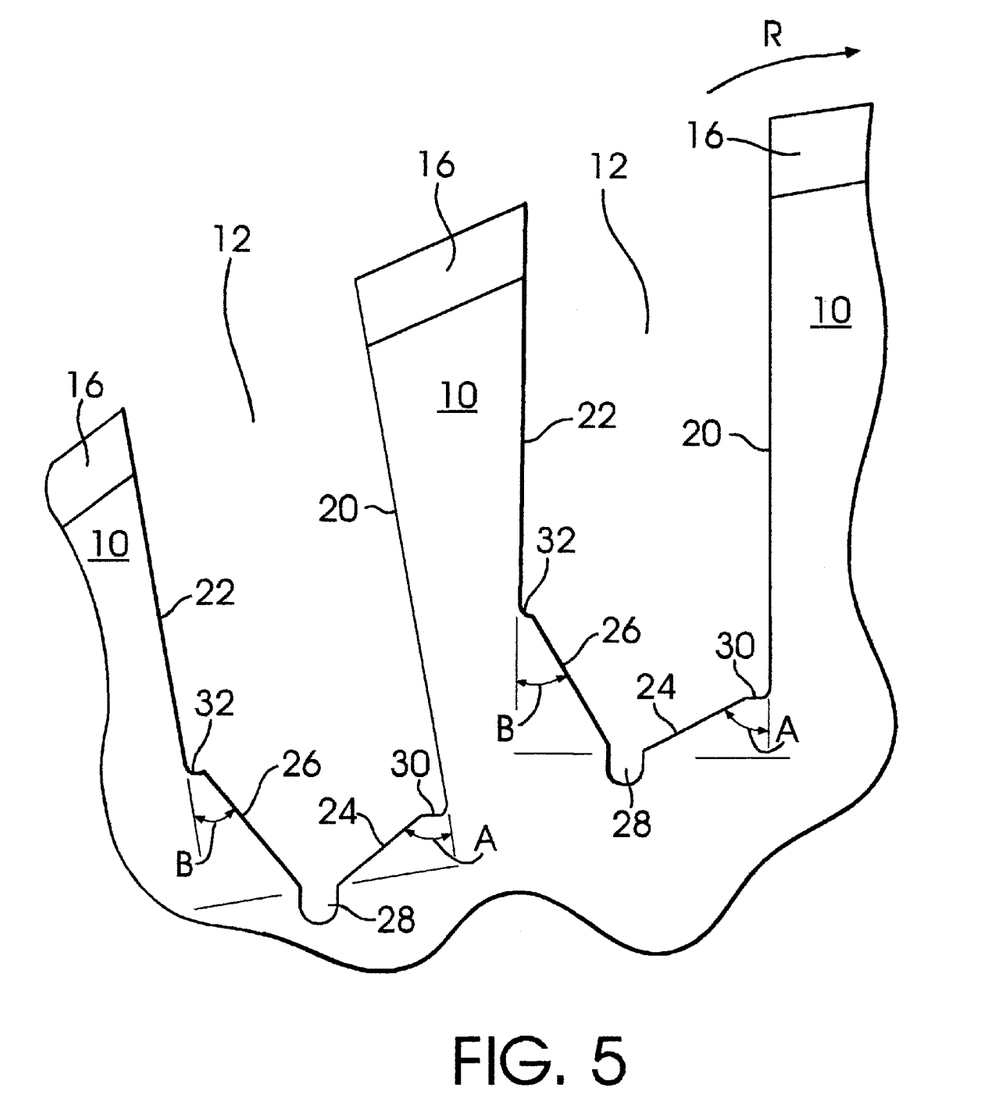
FIG. 5 is an enlarged view of a section of the cutter body member showing successive cutting blade receiving slots.

FIG. 5 is an enlarged view of two successive blade receiving slots 12, however, the following description applies to all slots in the cutter head. The slots each comprise opposing first and second side surfaces 20, 22. Each slot also includes an inner end portion comprising first mounting surface 24 and second mounting surface 26. First and second mounting surfaces 24, 26 extend toward one another with first mounting surface 24 extending at an angle A of less than 90 degrees with respect to first side surface 20 and second mounting surface 26 extending at an angle B of less than 90 degrees with respect to second side surface 22. First and second mounting surfaces 24, 26 extend toward one another and terminate short of their intersection at an innermost groove 28 known as a "check" which serves to provide machining clearance when finishing the mounting surfaces because a tool cannot adequately and repeatedly machine a sharp corner and besides, a sharp corner causes stress concentration.

Preferably, when first side surface 20 precedes second side surface 22 in the cutting direction as is shown by cutter rotational direction arrow R, angle A will be equal to about 60 degrees and angle B will be equal to about 30 degrees. Of course, if the direction of rotation is opposite that shown, the angular orientations of the mounting surfaces will be reversed. In all instances, it is desirable to have the steeper mounting surface (26 in FIG. 5) be positioned to absorb a greater amount of the cutting forces than the other mounting surface. The steeper surface directs more of the cutting forces inward toward the center of the cutter head thus reducing the tendency for cracks to develop between the projections 10 because there are less tangential forces exerted on the projections. As such, the back surface of a cutting blade should be positioned against the steeper mounting surface.

To examine cutter head strength, the following cutter heads were evaluated:

(1) a cutter head having a generally rectangular-shaped slot, (2) the cutter head of previously-discussed WO 97/39851 having inner end blade mounting surfaces each oriented at 45 degrees with respect to their adjoining side surfaces, and, (3) the cutter head of the present invention, as discussed above, having inner end blade mounting surfaces oriented at 60 degrees (angle A) and 30 degrees (angle B) with respect to their adjoining side surfaces.

The test was conducted by mounting a cutting blade in a slot of each of the above cutter heads and exerting a force in the appropriate direction on the cutting edge of the cutting blade so as to emulate actual cutting. The force was increased on each cutter head until cracks appeared in the cutter head. The conventional cutter head (1) exhibited cracks at a force of 4,800 pounds. while the cutter head with 45 degree mounting surfaces (2) cracked at 6,100 pounds. The cutter head of the present invention (3) cracked at 9,200 pounds, thus clearly showing a significant increase in strength over the other two cutter heads.

Figure 6:
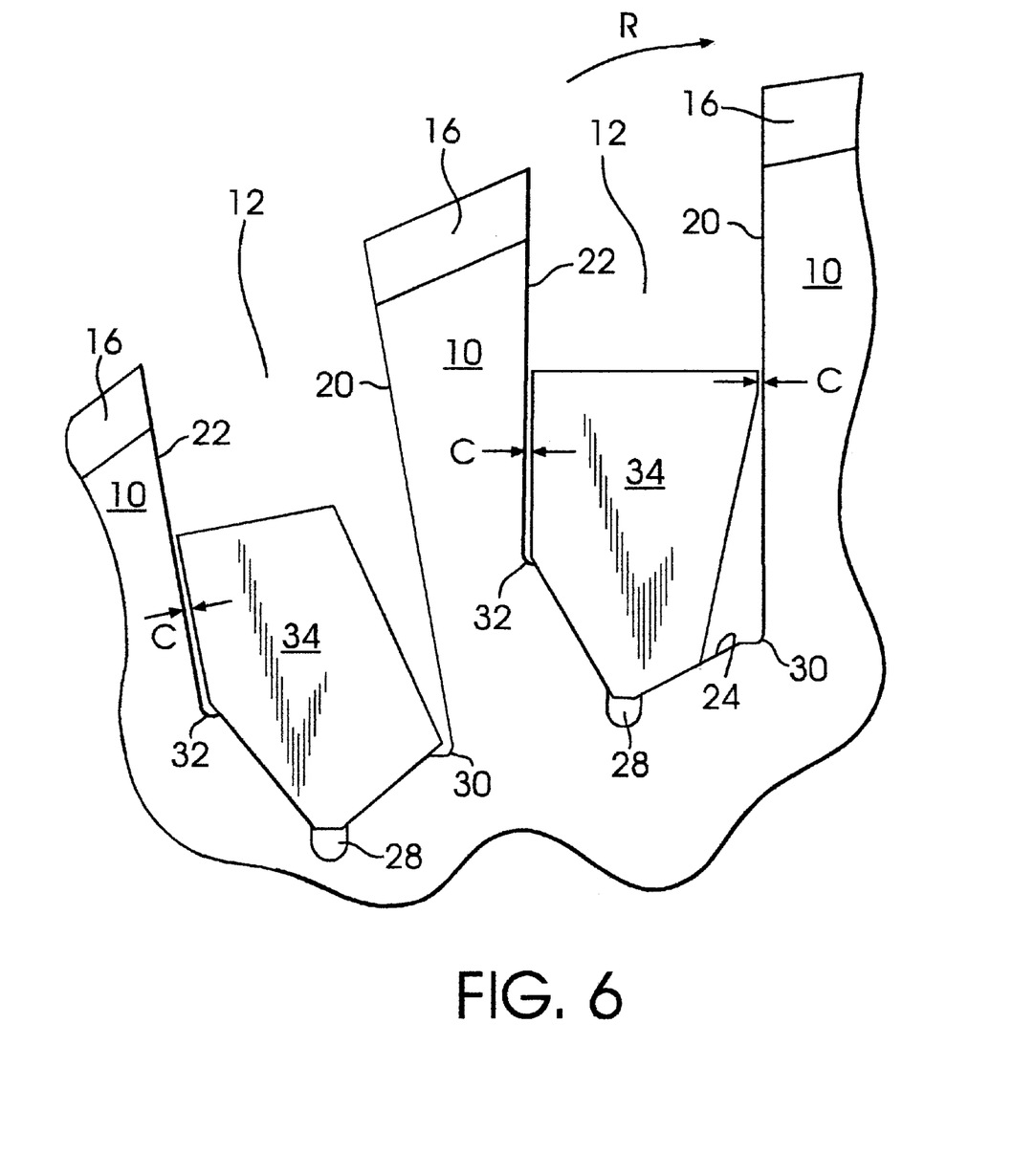
FIG. 6 is an enlarged view of a section of the cutter body member showing successive cutting blade receiving slots having cutting blades positioned therein.

Each blade receiving slot 12 preferably further includes a first shoulder 30 and a second shoulder 32 at the intersection of the respective side surface with its mounting surface. The purpose of these shoulders is to provide a small amount of clearance C (e.g. about 0.005 inch (0.127 mm)) between a cutting blade 34 and the first and second sides of the receiving slot 12. See FIG. 6. With this arrangement, all contact between the cutting blade 34 and the receiving slot 12 occurs at the seating surfaces 24, 26 thus creating a positive seating of the cutting blade against these mounting surfaces.

Figure 7:
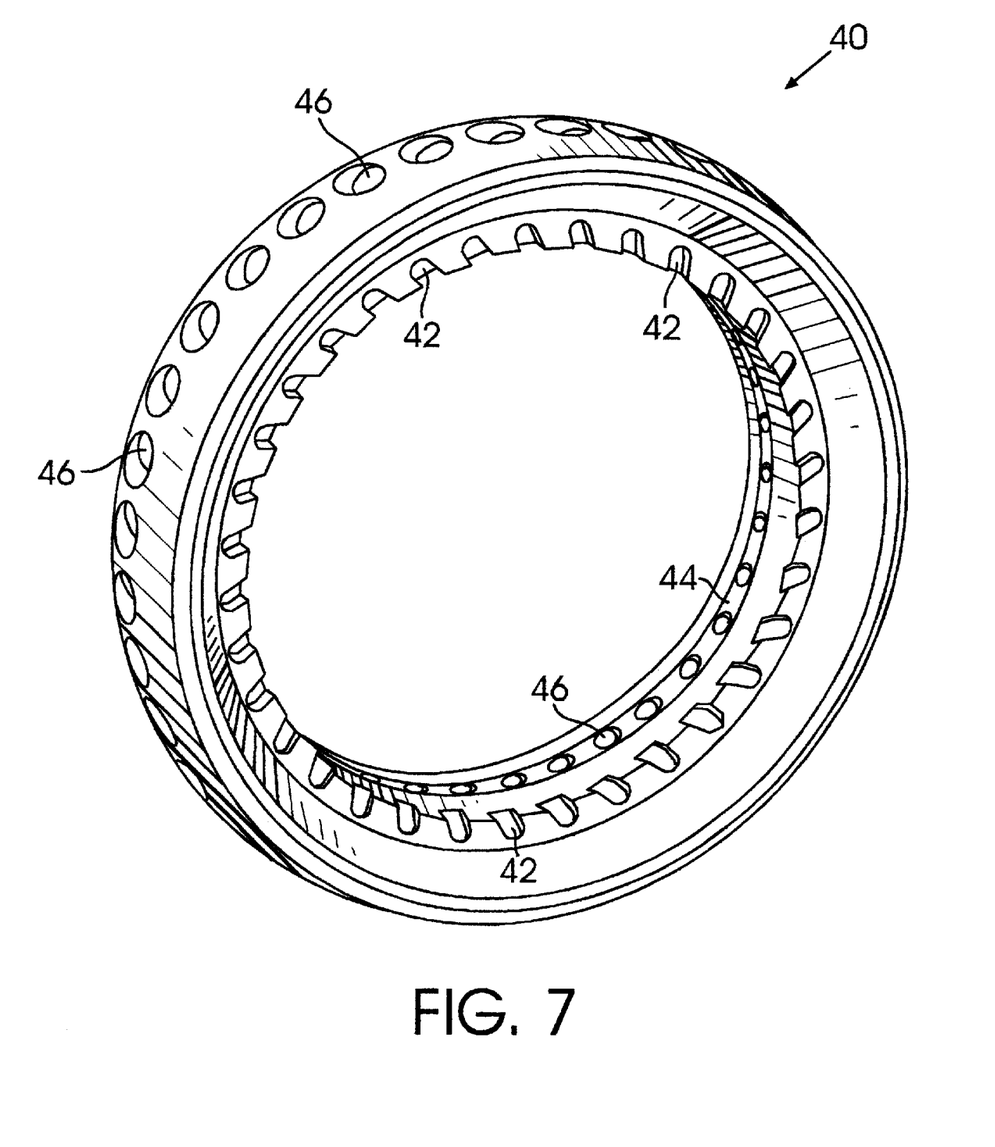
FIG. 7 illustrates a rear perspective view of a clamping ring according to the present invention.
Figure 9:
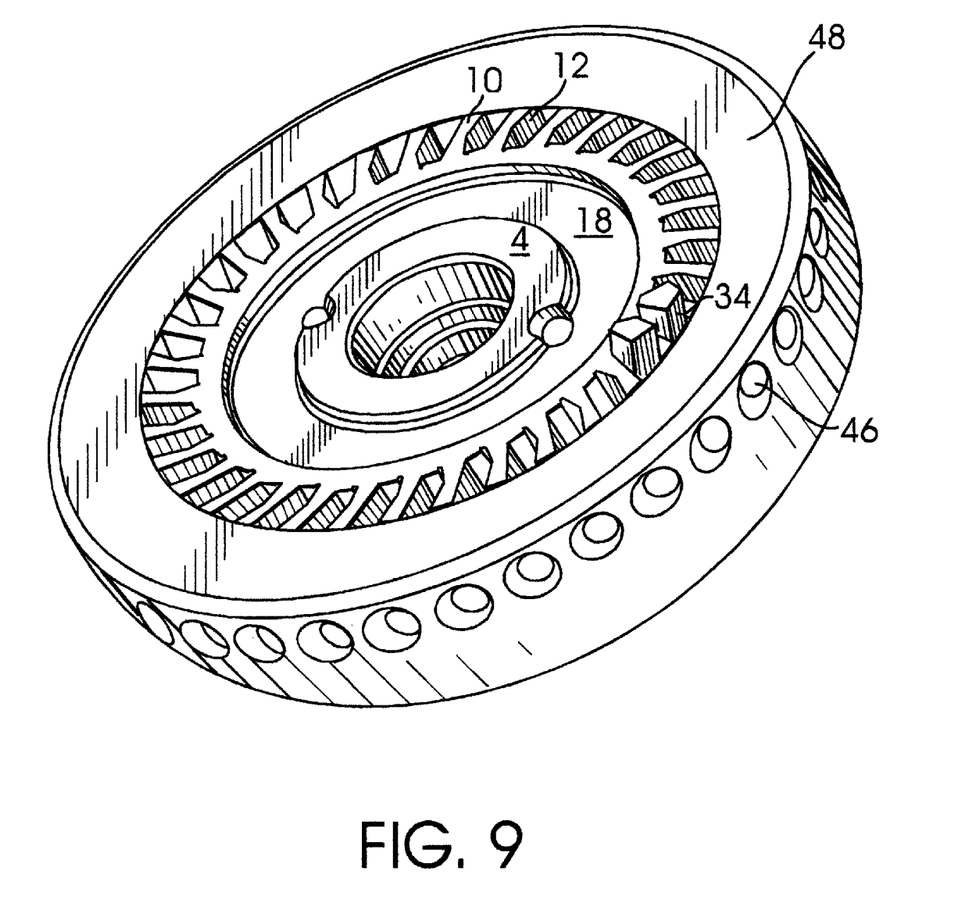
FIG. 9 illustrates a front perspective view of an assembled cutting tool according to the present invention.
Figure 10:
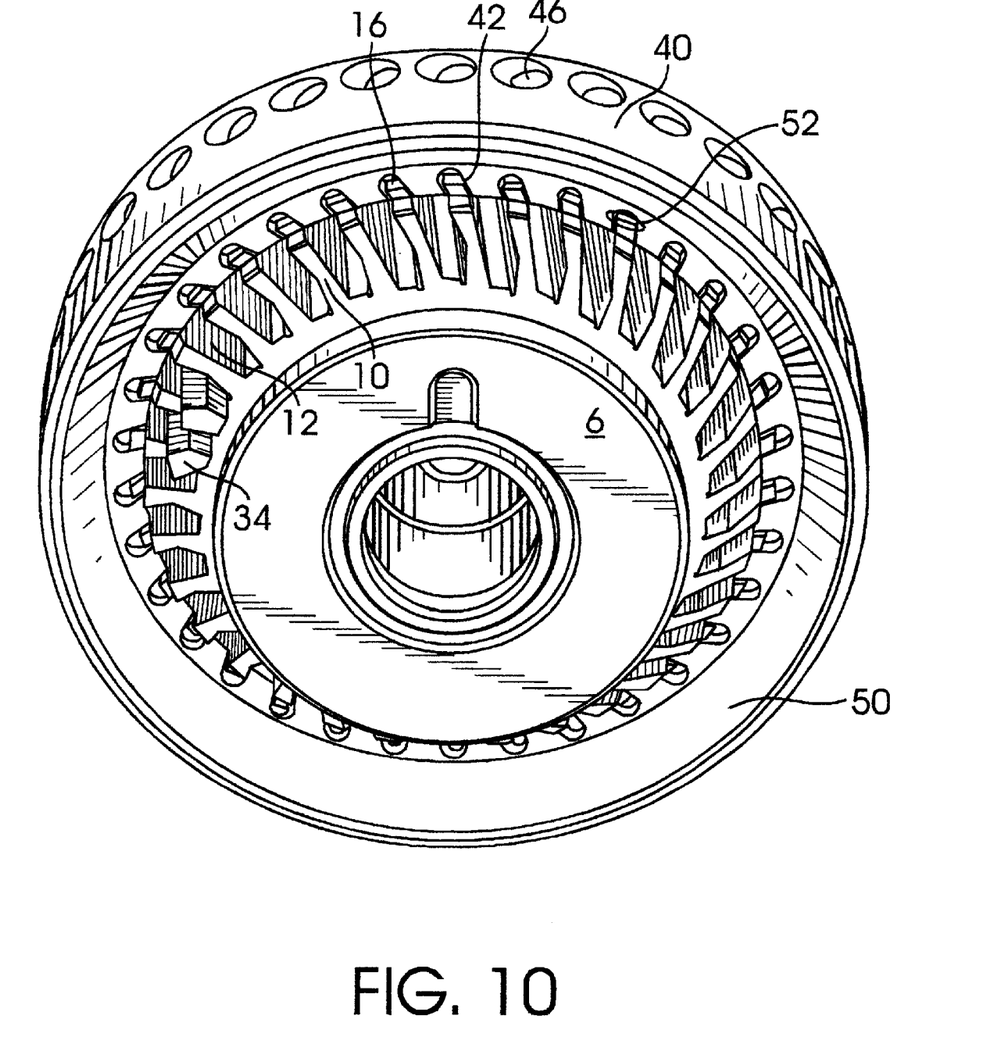
FIG. 10 illustrates a rear perspective view of an assembled cutting tool according to the present invention.

Positioned around the cutter body member 2 is a clamping ring 40 as seen in FIG. 7 which illustrates a bottom view thereof. The clamping ring 40 is heated to about 400° F. (204° C.) to expand the ring diameter sufficiently to allow the heated ring to be placed over the cutter body member 2 (FIG. 9). Upon cooling, the ring diameter shrinks thus adhering the clamping ring 40 to the cutter body member 2. The clamping ring 40 is placed about the cutter body member such that the protrusions 16 on the outer surface 14 of the projections 10 are inserted into respective slots 42 located in the inside of the clamping ring 40 (FIG. 10). Once the protrusions 16 are inserted into the receiving slots 42, the protrusion 16 and the receiving slot 42 may be spot welded together, as shown by 52 in FIG. 10, to further ensure the adherence of the clamping ring 40 to the cutter body member 2 and prevent any relative rotation between the two components during cutting operations. For illustrative purposes, two cutting blade blanks 34 are shown positioned in receiving slots in FIGS. 9 and 10.

Figure 8:
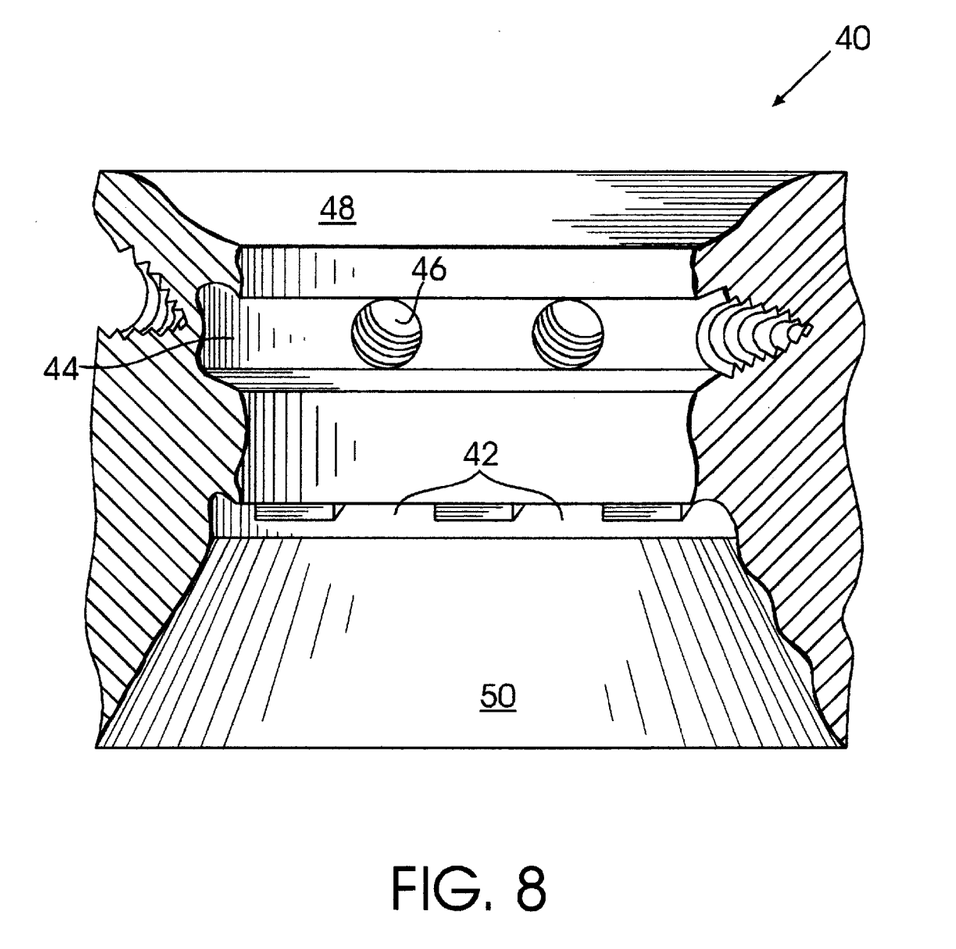
FIG. 8 illustrates a sectional view of the inside of the clamping ring of FIG. 7.

Also included in the clamping ring 40 is an inner channel 44 as shown in FIG. 8. Blade clamping means, discussed below, are positioned via screws extending through threaded holes 46. With this arrangement, the clamping means can be retained in the channel when the screws are withdrawn thus allowing cutting blades to be inserted into and removed from the receiving slot 12 without the clamping means falling from the receiving slot. Also seen in FIG. 8 are the receiving slots 42 into which the protrusions 16 are inserted when the clamping ring 40 is placed about the cutter body member 2. The clamping ring further includes a top surface 48 as well as a tapered bottom surface 50 which not only reduces the weight of the cutter head, but also forms a convenient handle to grasp for moving the cutter head.

Figure 11:
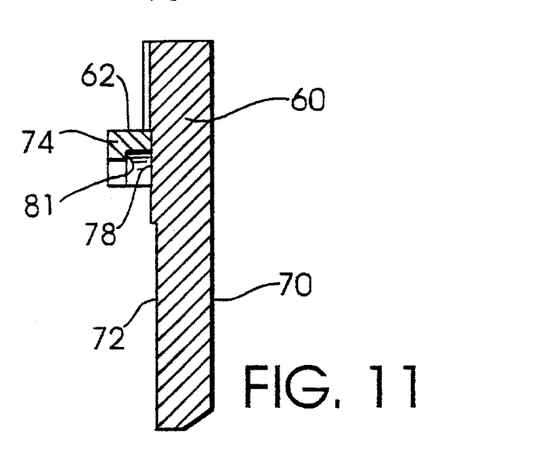
FIG. 11 shows a cross-sectional side view of a clamping block according to the present invention.
Figure 12:
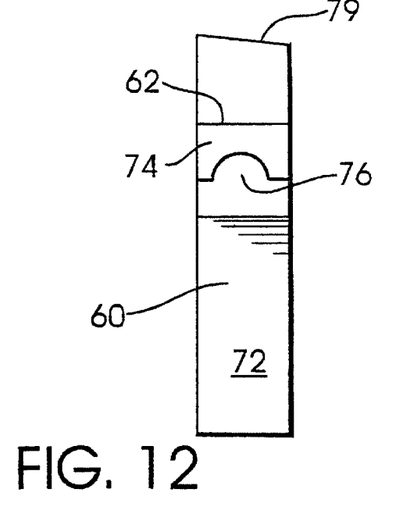
FIG. 12 shows a front view of the clamping block of FIG. 11.
Figure 13:
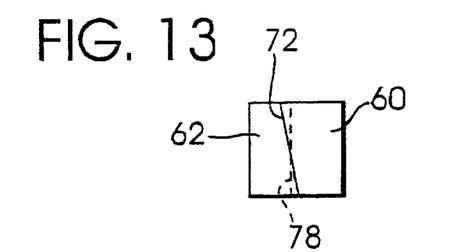
FIG. 13 illustrates a top view of the clamping block of FIG. 11.
Figure 14:
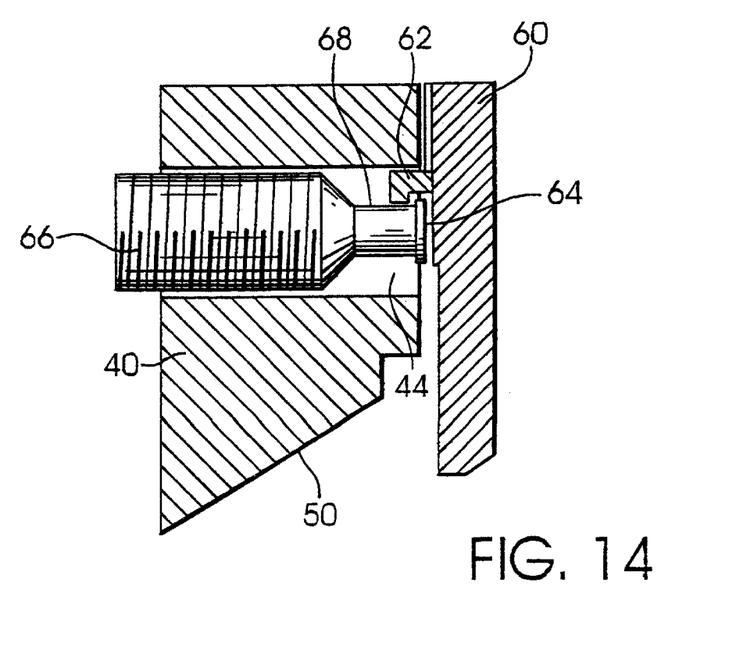
FIG. 14 shows a cross-sectional view of an inventive clamping arrangement positioned in a clamping ring.

The cutting blade clamping means is shown in FIGS. 11–14. The clamping block 60 is shown in FIG. 11 wherein the clamping block is shown in an unclamped position. The clamp block includes a front surface 70 which contacts a cutting blade and a back surface 72. The clamping means includes a housing 62 integral with the clamp block 60 for receiving the head portion 64 of a clamping screw 66 as shown in FIG. 14. The threaded portion of the clamping screw 66 is connected to the head portion 64 via a neck portion 68. The receiving housing 62 comprises a generally box-like shape with an open bottom and a front portion 74 having a semi-circular opening 76 (FIG. 12) formed therein. The semi-circular opening 76 is large enough to fit over the neck portion 68 of the clamping screw 66 but is small enough to prevent passage of the larger-diameter head portion 64 therethrough. The top surface 79 of the clamp block may be angled as shown in FIG. 12 by an amount to match the hook angle of the receiving slot 12 in the cutter head.

Figure 15:
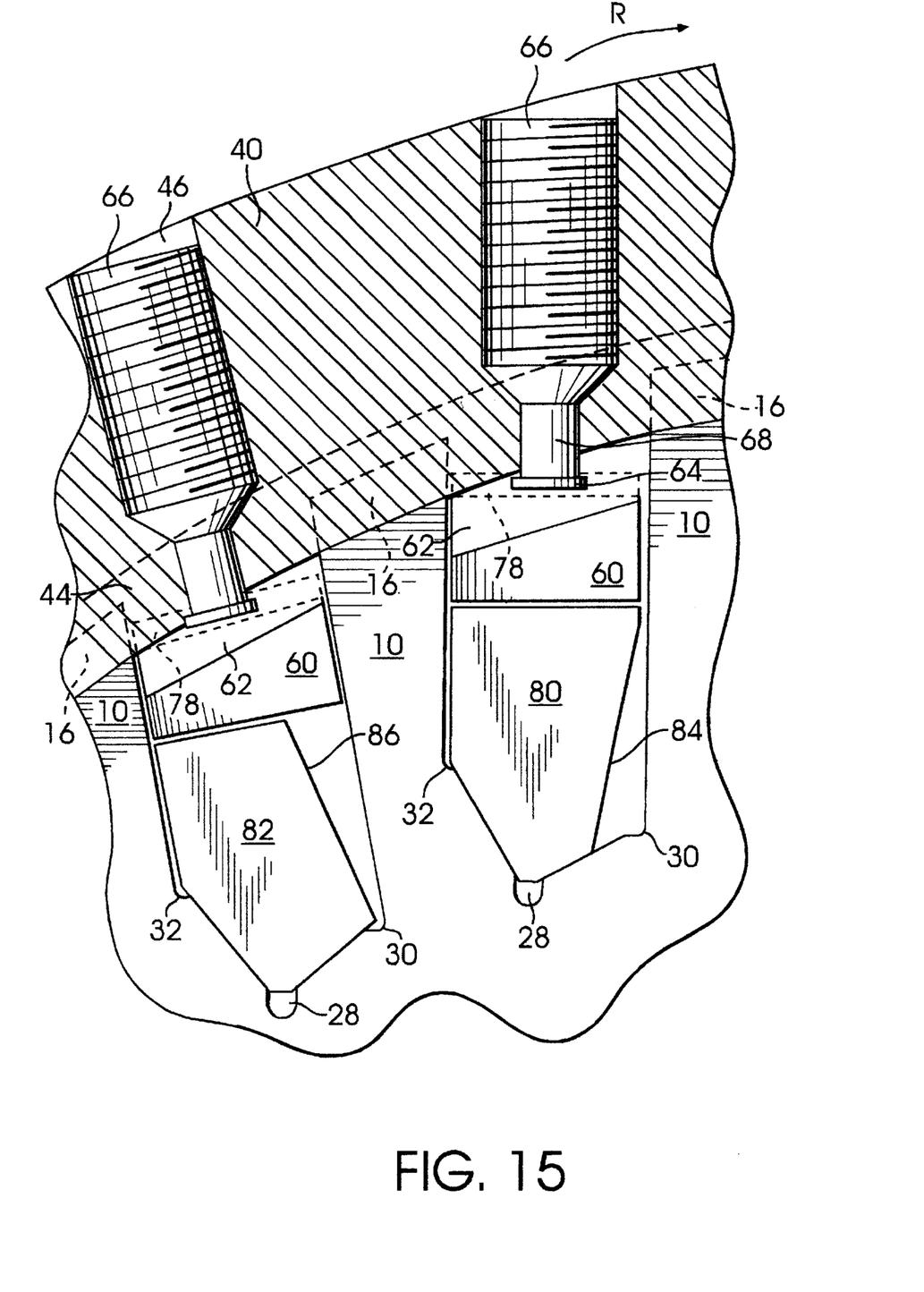
FIG. 15 illustrates a top sectional view of an assembled cutting tool according to the present invention.

It should be noted that within the receiving housing 62, the back surface 72 of the clamp block 60 should be machined to be essentially parallel with the front surface 70 as is shown by 78 in FIG. 13. This will allow the head portion 64 of the clamp screw 66 to evenly seat against the back surface 72 when clamping a cutting blade into position in the receiving slot 12 as is illustrated in FIG. 15.

When it is necessary to remove or insert a cutting blade into a receiving slot 12 of the cutter head, clamping screw 66 is rotated to withdraw it from the clamping ring 40. This movement results in the head portion 64 engaging the inside surface 81 of the front portion 74 of the receiving housing 62 thus moving the clamp block 60 toward the inside surface of the clamping ring 40. The receiving housing 62 is of a size whereby is fits into inner channel 44 of the clamping ring 40 as can be seen in FIG. 14. The back surface 72 of the clamp block 60 is an angled surface, as seen in FIG. 13, which approximates the curvature of the inner surface of the clamping ring 40 thereby allowing the back surface 72 of the clamp block 60 to be positioned against the inner surface of the clamping ring 40. With this arrangement, sufficient clearance is provided to insert and/or remove a cutting blade from a receiving slot while maintaining the clamp block 60 in position in the receiving slot 12 of the cutter head.

The form of the front surface 70 of clamping block 60 is similar to that disclosed in previously discussed WO 97/39851 in that the form of the front surface 70 is generally concave-shaped, preferably constructed from through-hardened spring steel. The advantage of this form is that when clamped against a cutting blade, clamping forces are exhibited not only in line with the force of the clamping screw 66, but clamping forces are also present at the ends of the clamping block 60 due to the form of the clamping block 60 and the increased forces created at the ends of the clamping block 60 when it is elastically distorted from its original concave shape to an essentially flat form against a cuffing blade. In addition to clamping forces, frictional forces are also present between the end and clamp screw clamping forces which assist in securing the cutting blade in its position in the cutter head slot. After the concave shape is straightened, an increase in torque occurs on the clamping screw. This can be sensed as a stop signal and therefore, a torque wrench is not necessary.

With the clamping block of FIG. 11, it can be seen that the clamp screw and/or attachment means is located asymmetrically along the length of the clamp block thus providing differing clamp pressures at the ends of the clamp block. This arrangement is beneficial when additional clamping pressure is desired near the cutting end of a cutting blade such as in those situations where a significant length of cutting blade extends beyond the face of the cutter head.

The concave clamp block controls the clamp force and pressure distribution between the clamp block the cutting blade. Primarily, the radius of curvature of the concave clamp block is the control parameter and this permits a "built-in" mechanism to control clamping pressure by varying the radius of curvature of the clamp block. By controlling the clamping force of the clamp block, an allowable maximum clamp force can be designed into the clamp block which, when exceeded, permits movement of the cutting blade in a cutter head slot, such as when cutting forces become greater than the maximum clamping force, thus preventing damage to a cutter.

FIG. 15 shows cutting blades 80 and 82 clamped into position in a cutter head of the present invention. Clamp screws 66 have been rotated inwardly thus engaging clamp screw head portion 64 with the surface 78 within receiving housing 62 thereby moving the receiving housing 62 in an inward direction out of the inner channel 44 while simultaneously moving clamp block 60 inward into contact with a side surface of cutting blades 80 and 82.

Cutting blades 80 and 82 are shown in FIG. 15 as having respective rake faces 84, 86 inclined in opposite directions whereby it is understood by the artisan that given the direction of cutter rotation, R, as shown, cutting blade 80 is an outside cutting blade and will cut a concave tooth flank of a workpiece while cutting blade 82 is an inside cutting blade and will cut a convex tooth flank of the workpiece.

Figures 16, 17, 18, 19, 20:
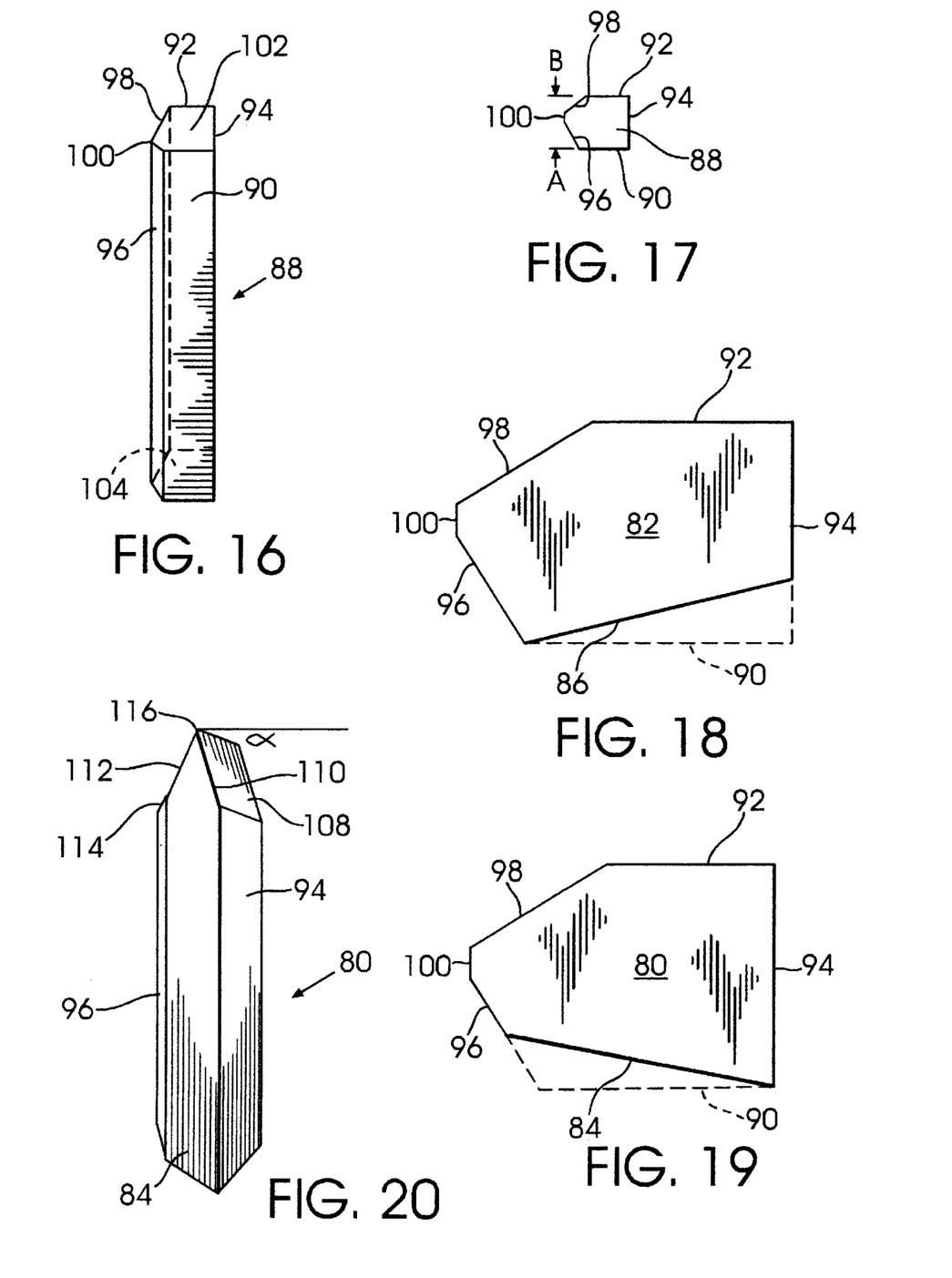
FIG. 16 shows a cutting blade blank from which a cutting blade is formed for the cutting tool of the present invention.
FIG. 17 is a cross-sectional view of the cutting blade blank of FIG. 16.
FIGS. 18 and 19 are cross-sectional views of the cutting blades shown in FIG. 15.
FIG. 20 illustrates a cutting blade formed from the cutting blade blank of FIG. 16.

A cutting blade blank 88 suitable for positioning if the receiving slots 12 of the inventive cutting tool is shown in FIG. 16. The general form of the cutting blade is that as shown in previously discussed WO 97/39851 except that instead of mounting surfaces 96 and 98 each being oriented at 45 degrees with respect to their respective side surfaces 90 and 92 as is preferred in the above-mentioned publication, the mounting surfaces are oriented at an angle A equal to 60 degrees and an angle B equal to 30 degrees as can be seen in FIG. 17. These angles correspond to angles A and B shown with respect to the mounting surfaces 24, 26 of the blade receiving slots 12 in FIGS. 5 and 6. Cutting blade blank 88 further includes outer end surface 94 and inner end surface 100.

The cutting blade blank 88 may be made of any suitable tool material such as high speed tool steel (e.g. M4) or carbide such as Fine Grain or Ultra-Fine Grain K-grade WC-Co or K-P grades WC with one or more of Co, Ti and Ta.

FIGS. 18 and 19 illustrate, in enlarged fashion, cross-sectional views of cutting blades 80 and 82 having rake faces 84 and 86 (as seen in FIG. 15) with the dashed lines indicating the stock material removed from a blade blank, such as the blade blank of FIGS. 16 and 17, in order to form the rake faces shown. Of course, the end 102 would have cutting and clearance side profile surfaces formed thereon. It can also be recognized that angle A could be measured with respect to side surface 92 if rake faces 84 or 86 are present.

FIG. 20 shows such cutting blade 80 whose cross-section is shown in FIG. 18. Cutting blade 80 includes a cutting side profile surface 108 which forms a cutting edge 110 at its intersection with front rake face 84. A clearance side profile surface (not shown) is formed on the opposite side of cutting blade 80 and its intersection with front rake surface 84 and mounting surface 96 form respective clearance edges 112 and 114. Cutting blade 80 also includes a tip 116 oriented at a relief angle α. If desired, cutting blade 80 may further include a slot extending lengthwise in the front surface of the blade for forming a secondary cutting edge as is known from previously discussed U.S. Pat. No. 4,575,285.

It is to be understood if the direction of cutter rotation shown in FIG. 15 were reversed, the cutting blade blank 88 as shown in FIG. 16 could be rotated 180 degrees end-for-end (ends 102 and 104 reversed) and cutting and clearance profile surfaces could then be formed on end 104.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A cutting tool for producing toothed workpieces, said cutting tool comprising:

a cutter body member having a generally circular shape, a front surface, a back surface and an axis of rotation, said cutter body member having an outer portion comprising a plurality of individual projections arranged spaced from one another about said cutter body member, the space between successive projections defining receiving slots for cutting blades, said individual projections each further comprising an outer surface with at least one said outer surface including a key projecting outward from said outer surface, a clamping ring extending about said cutter body member, said clamping ring including at least one keyway with said key on said at least one outer surface being positioned in said at least one keyway, at least one cutting blade positioned in at least one of said blade receiving slots, wherein each of said blade receiving slots comprises opposing first and second side surfaces and an inner end portion, said inner end portion having a pair of angled mounting surfaces, one of said mounting surfaces extending from said first side surface and the other of said mounting surfaces extending from said second side surface with said angled mounting surfaces extending toward one another, each of said angled mounting surfaces being oriented at an angle of less than 90 degrees with respect to their respective side surface, and, wherein, with respect to the direction of cutter rotation, said first side surface precedes said second side surface and wherein the angle between said first side surface and its respective angled mounting surface is larger than the angle between the second side surface and its respective angled mounting surface.

2. The cutting tool of claim 1 wherein the angle between said first side surface and its respective angled mounting surface is equal to about 60 degrees and the angle between the second side surface and its respective angled mounting surface is equal to about 30 degrees.

3. A cutting tool for producing toothed workpieces, said cutting tool comprising:

a cutter body member having a generally circular shape, a front surface, a back surface and an axis of rotation, said cutter body member having an outer portion comprising a plurality of individual projections arranged spaced from one another about said cutter body member, the space between successive projections defining receiving slots for cutting blades, a clamping ring extending about said cutter body member and secured to said cutter body member, said blade receiving slots each comprising opposing first and second side surfaces and an inner end portion, said inner end portion having first and second angled mounting surfaces, said first angled mounting surface extending from said first side surface and said second angled mounting surface extending from said second side surface with said angled mounting surfaces extending toward one another, each of said angled mounting surfaces being oriented at an angle of less than 90 degrees with respect to their respective side surface, wherein the angle between said first side surface and its respective angled mounting surface is equal to about 60 degrees and the angle between the second side surface and its respective angled mounting surface is equal to about 30 degrees, at least one cutting blade positioned in at least one of said blade receiving slots, said at least one cutting blade having a side surface a portion of which is of a shape complementary to that of said angled mounting surfaces, wherein said at least one cutting blade comprises a first angled mounting surface oriented at an angle of about 60 degrees with respect to a respective first side surface and being complementary with the first angled mounting surface of the blade receiving slots, said at least one cutting blade further comprising a second angled mounting surface oriented at an angle of about 30 degrees with respect to a respective second side surface and being complementary with the second angled mounting surface of the blade receiving slots.

4. The cutting tool of claim 3 wherein said individual projections each further comprise an outer surface with at least one said outer surface including a key projecting outward from said outer surface.

5. A cutting tool for producing toothed workpieces, said cutting tool comprising:

a cutter body member having an axis of rotation and a plurality of blade receiving slots, said blade receiving slots each comprising opposing first and second side surfaces and an inner end portion, said inner end portion having first and second angled mounting surfaces, said first angled mounting surface extending from said first side surface and said second angled mounting surface extending from said second side surface with said angled mounting surfaces extending toward one another, said first side surface preceding said second side surface, with respect to the direction of cutter rotation, and wherein the angle between said first side surface and its respective angled mounting surface is equal to about 60 degrees and the angle between the second side surface and its respective angled mounting surface is equal to about 30 degrees, at least one cutting blade positioned in at least one of said blade receiving slots, said at least one cutting blade having a side surface, a portion of said side surface having a shape complementary to that of said angled mounting surfaces.

6. The cutting tool of claim 5 wherein said at least one cutting blade comprises a first angled mounting surface oriented at an angle of about 60 degrees with respect to a respective first side surface and being complementary with the first angled mounting surface of the blade receiving slots, said at least one cutting blade further comprising a second angled mounting surface oriented at an angle of about 30 degrees with respect to a respective second side surface and being complementary with the second angled mounting surface of the blade receiving slots.

7. The cutting tool of claim 5 wherein said inner end portion further includes an end surface extending between said first and second angled mounting surfaces.

8. A cutter body member of a cutting tool for producing toothed articles, said cutter body member comprising:

a generally circular shape and having a front surface, a back surface and an axis of rotation, said cutter body member having an outer portion comprising a plurality of individual projections arranged spaced from one another about said cutter body, the space between successive projections defining receiving slots for cutting blades, said individual projections each further comprising an outer surface with at least one said outer surface including a key projecting outward from said outer surface, wherein each of said blade receiving slots comprises opposing first and second side surfaces and an inner end portion, said inner end portion having a pair of angled mounting surfaces, one of said mounting surfaces extending from said first side surface and the other of said mounting surfaces extending from said second side surface with said angled mounting surfaces extending toward one another, each of said angled mounting surfaces being oriented at an angle of less than 90 degrees with respect to their respective side surface, and, wherein, with respect to the direction of cutter rotation, said first side surface precedes said second side surface and wherein the angle between said first side surface and its respective angled mounting surface is larger than the angle between the second side surface and its respective angled mounting surface.

9. The cutter body member of claim 8 further comprising:

an annular depression in said front surface, said annular depression located radially inward of said outer portion and concentric about said axis.

10. The cutter body member of claim 8 wherein each of said individual projections includes a key projecting from its respective outer surface.

11. The cutter body member of claim 8 wherein the angle between said first side surface and its respective angled mounting surface is equal to about 60 degrees and the angle between the second side surface and its respective angled mounting surface is equal to about 30 degrees.

12. A cutter ring member positionable about a cutter body member having a generally circular shape, a front surface, a back surface and an axis of rotation, said cutter body member having an outer portion comprising a plurality of individual projections arranged spaced from one another about said cutter body, the space between successive projections defining receiving slots for cutting blades, said cutter ring member comprising:

an outer surface extending a predetermined height between a first outer surface end and a second outer surface end, an inner surface arranged inwardly of said outer surface and being generally parallel with said outer surface, said inner surface extending between a first inner surface end and a second inner surface end, with space between the first end of said outer surface and the first end of said inner surface defining a top surface of the cutter ring member, a shoulder surface located adjacent said second end of said inner surface, said shoulder surface extending outwardly toward said outer surface and comprising at least one keyway therein, tapered bottom surface extending angularly between said shoulder surface and said second end of said outer surface.

13. A cutting blade insertable into a cutter body member having a generally circular shape, a front surface, a back surface and an axis of rotation, said cutter body member having a plurality of individual projections arranged spaced from one another about said cutter body, the space between successive projections defining receiving slots for the cutting blades, said cutting blade comprising:

a tip, a first side surface and a second side surface, an outer end surface extending between said first and second side surfaces, an inner end surface comprising first and second angled portions, said first angled portion extending from said first side surface and said second angled portion extending from said second side surface, said angled portions extending toward one another, said first angled portion being arranged at an angle of one of 60 degrees or 30 degrees with respect to said second side surface and said second angled portion being arranged at an angle of the other of 60 degrees or 30 degrees with respect to said second side surface, a cutting profile surface located on one of said inner or outer end surfaces at an end of said length, said cutting profile surface extending from said first side surface to said second side surface, a first cutting edge being defined at the intersection of said cutting profile surface and said first side surface, a clearance profile surface located on the other of said inner or outer end surfaces at said end of said length, said clearance profile surface extending from said first side surface to said second side surface, a clearance edge being defined at the intersection of said clearance profile surface and said first side surface.

14. The cutting blade of claim 13 further including an end surface extending between said first and second angled portions.

15. The cutting blade of claim 13 further comprising at least a portion of said first side surface being oriented at a predetermined rake angle.

16. A cutter head in which a cutting blade for producing toothed workpieces is positionable, said cutter head comprising:

a cutter body member having a generally circular shape, a front surface, a back surface and an axis of rotation, said cutter body member having an outer portion comprising a plurality of individual projections arranged spaced from one another about said cutter body member, the space between successive projections defining receiving slots for cutting blades, a clamping ring extending about said cutter body member, wherein each of said blade receiving slots comprises opposing first and second side surfaces and an inner end portion, said inner end portion having a pair of angled mounting surfaces, one of said mounting surfaces extending from said first side surface and the other of said mounting surfaces extending from said second side surface with said angled mounting surfaces extending toward one another, each of said angled mounting surfaces being oriented at an angle of less than 90 degrees with respect to their respective side surface, and, wherein when rotated in a cutting direction, said first side surface precedes said second side surface and wherein the angle between said first side surface and its respective angled mounting surface is larger than the angle between the second side surface and its respective angled mounting surface.

* * * * *